United States Patent
Du et al.

(10) Patent No.: US 12,321,628 B2
(45) Date of Patent: *Jun. 3, 2025

(54) DATA MIGRATION METHOD, HOST, AND SOLID STATE DISK

(71) Applicant: Huawei Technologies Co., Ltd., Shenzhen (CN)

(72) Inventors: Ge Du, Xi'an (CN); Yu Hu, Shenzhen (CN); Jiancen Hou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,269

(22) Filed: Apr. 15, 2024

(65) Prior Publication Data

US 2024/0264760 A1 Aug. 8, 2024

Related U.S. Application Data

(63) Continuation of application No. 18/313,467, filed on May 8, 2023, now Pat. No. 11,960,749, which is a
(Continued)

(51) Int. Cl.
*G06F 12/00* (2006.01)
*G06F 3/06* (2006.01)
(Continued)

(52) U.S. Cl.
CPC ......... *G06F 3/0647* (2013.01); *G06F 3/0604* (2013.01); *G06F 3/061* (2013.01);
(Continued)

(58) Field of Classification Search
CPC ...... G06F 3/0647; G06F 3/0604; G06F 3/061; G06F 3/0646; G06F 3/0688; G06F 12/0246; G06F 12/0868
See application file for complete search history.

(56) References Cited

U.S. PATENT DOCUMENTS

| 6,108,748 A | 8/2000 | Ofek et al. |
| 6,230,239 B1 | 5/2001 | Sakaki et al. |

(Continued)

FOREIGN PATENT DOCUMENTS

| CN | 101446924 A | 6/2009 |
| CN | 103858092 A | 6/2014 |

(Continued)

OTHER PUBLICATIONS

"PCI Express Base Specification Revision 3.0," Nov. 10, 2010, 860 pages.
(Continued)

*Primary Examiner* — John A Lane
(74) *Attorney, Agent, or Firm* — Conley Rose, P.C.

(57) ABSTRACT

A host of a storage system is coupled to multiple SSDs. Each SSD is configured with a migration cache, and each SSD corresponds to one piece of access information. The host obtains migration data information of to-be-migrated data in a source SSD, determines a target SSD, and sends a read instruction carrying information about to-be-migrated data and the target SSD to the source SSD. The source SSD reads a data block according to the read instruction from a flash memory of the source SSD into a migration cache of the target SSD. After a read instruction is completed by the SSD, the host sends a write instruction to the target SSD to instruct the target SSD to write the data block in the cache of the target SSD to a flash memory of the target SSD.

20 Claims, 13 Drawing Sheets

Related U.S. Application Data continuation of application No. 16/985,575, filed on Aug. 5, 2020, now Pat. No. 11,644,994, which is a continuation of application No. 16/423,341, filed on May 28, 2019, now Pat. No. 10,795,599, which is a continuation of application No. PCT/CN2016/107368, filed on Nov. 26, 2016.

(51) Int. Cl.
  *G06F 12/02* (2006.01)
  *G06F 12/0868* (2016.01)

(52) U.S. Cl.
  CPC .......... *G06F 3/0646* (2013.01); *G06F 3/0688* (2013.01); *G06F 12/0246* (2013.01); *G06F 12/0868* (2013.01)

(56) References Cited

U.S. PATENT DOCUMENTS

| | | | |
|---|---|---|---|
| 9,055,119 | B2 | 6/2015 | Zhou et al. |
| 2003/0167312 | A1 | 9/2003 | Mori |
| 2006/0236056 | A1 | 10/2006 | Nagata |
| 2012/0030414 | A1 | 2/2012 | Jo et al. |
| 2012/0059994 | A1 | 3/2012 | Montgomery et al. |
| 2012/0096231 | A1 | 4/2012 | Morishita et al. |
| 2012/0239864 | A1 | 9/2012 | Montgomery et al. |
| 2012/0254546 | A1 | 10/2012 | Montgomery et al. |
| 2013/0080723 | A1 | 3/2013 | Sawa et al. |
| 2013/0173855 | A1 | 7/2013 | Kim et al. |
| 2014/0297780 | A1 | 10/2014 | Zhou et al. |
| 2014/0317336 | A1* | 10/2014 | Fitch ................... G06F 12/1036 711/103 |
| 2015/0095551 | A1 | 4/2015 | Confalonieri et al. |
| 2015/0095575 | A1 | 4/2015 | Oh et al. |
| 2015/0120969 | A1 | 4/2015 | He et al. |
| 2015/0161051 | A1* | 6/2015 | Aikoh ................ G06F 9/45558 711/119 |
| 2015/0193154 | A1 | 7/2015 | Gong et al. |
| 2015/0229717 | A1* | 8/2015 | Gupta ..................... H04L 67/34 718/1 |
| 2015/0278246 | A1 | 10/2015 | Toyama et al. |
| 2016/0011818 | A1 | 1/2016 | Hashimoto et al. |
| 2016/0019145 | A1 | 1/2016 | Mimata et al. |
| 2016/0026409 | A1 | 1/2016 | Tanaka et al. |
| 2016/0034193 | A1 | 2/2016 | Aslam et al. |
| 2016/0197985 | A1* | 7/2016 | Watson ............... H04L 67/1008 709/221 |
| 2016/0266827 | A1 | 9/2016 | Hasegawa et al. |
| 2016/0306552 | A1 | 10/2016 | Liu et al. |
| 2016/0378377 | A1 | 12/2016 | Hu et al. |
| 2017/0075625 | A1 | 3/2017 | Nazari et al. |
| 2017/0185512 | A1 | 6/2017 | Small et al. |
| 2020/0387575 | A1 | 12/2020 | Palekar et al. |

FOREIGN PATENT DOCUMENTS

| | | |
|---|---|---|
| CN | 104487952 A | 4/2015 |
| JP | 2002091897 A | 3/2002 |
| JP | 2006018642 A | 1/2006 |
| JP | 2006301820 A | 11/2006 |
| JP | 2015537310 A | 12/2015 |
| JP | 2016503925 A | 2/2016 |
| JP | 2016170696 A | 9/2016 |
| JP | 2016536732 A | 11/2016 |
| WO | 2014129161 A1 | 8/2014 |

OTHER PUBLICATIONS

Lee, D., et al., "Decoupled Direct Memory Access: Isolating CPU and IO Traffic by Leveraging a Dual-Data-Port DRAM," 2015, 14 pages.

* cited by examiner

DATA MIGRATION METHOD, HOST, AND SOLID STATE DISK

CROSS-REFERENCE TO RELATED APPLICATIONS

This is a continuation of U.S. patent application Ser. No. 18/313,467 filed on May 8, 2023, now U.S. Pat. No. 11,960,749, which is a continuation of U.S. patent application Ser. No. 16/985,575 filed on Aug. 5, 2020, now U.S. Pat. No. 11,644,994, which is a continuation of U.S. patent application Ser. No. 16/423,341 filed on May 28, 2019, now U.S. Pat. No. 10,795,599, which is a continuation of Int'l Patent App. No. PCT/CN2016/107368 filed on Nov. 26, 2016, all of which are incorporated by reference.

FIELD

The present disclosure relates to the field of storage technologies, and in particular, to a method for migrating data between storage devices.

BACKGROUND

As costs of a solid-state disk (SSD) continuously decrease and a Non-Volatile Memory Express (NVMe) develops, featuring high performance and a low delay, currently an SSD based on the NVMe standard gradually replaces a conventional mechanical hard disk, and becomes a main storage medium in a storage system.

In actual application, data needs to be frequently migrated between SSDs in the storage system. For example, in the storage system, there is a large quantity of SSDs and a large capacity, and therefore there is a relatively high failure probability. To avoid a data loss, an SSD that is to be invalidated, namely, a to-be-invalidated SSD, needs to be identified in advance, and then data in the to-be-invalidated SSD is migrated to another SSD for backup.

In some approaches, when data is migrated between SSDs, a memory space dedicated for data migration in a memory of a host of the storage system needs to be first allocated, and then a central processing unit (CPU) of the host reads data in a source SSD (an SSD from which the data is migrated, for example, a detected to-be-invalidated SSD) into the memory space, and finally writes the data in the memory space to a target SSD (an SSD to which the data is migrated). It may be learned that, in some approaches, when data is migrated between SSDs, for the migrated data, a data transmission process needs to be controlled by the CPU of the host, and consequently, CPU bandwidth of the host is occupied. In this way, normal access to data in another SSD is affected, and performance of the entire storage system is affected. To reduce impact of data migration between SSDs on the performance of the storage system, the CPU bandwidth of the host that is occupied during the data migration between SSDs is usually limited. Consequently, the data migration between SSDs takes an excessively long time, and increases a risk of a data loss. In addition, even if bandwidth for the data migration between SSDs is limited, the performance of the storage system is still affected.

SUMMARY

Embodiments of the present disclosure provide a method for migrating data between SSDs. During data migration, CPU bandwidth of a host is not occupied, thereby not affecting performance of a storage system, and ensuring a data migration speed.

According to a first aspect, an embodiment of the present disclosure provides a data migration method, and the data migration method is applied to a host. The host is coupled to multiple SSDs, and the multiple SSDs are coupled to each other. Each SSD is configured with a migration cache, and access information of the migration cache of each SSD is recorded on the host. The host or another SSD that is coupled to the host accesses the migration cache of each SSD according to the access information. For example, SSDs coupled to the host are an SSD 0 to an SSD 24. A cache provided by any SSD (for example, the SSD 0) may be accessed by the host and another SSD (the SSD 1 to the SSD 24) according to the access information.

The data migration method includes: obtaining migration data information of to-be-migrated data in a source SSD and determining a target SSD, generating a read instruction according to access information corresponding to the target SSD and the migration data information, and sending the read instruction to the source SSD, where the read instruction is used to instruct the source SSD to read a data block that is corresponding to the read instruction and in a flash memory of the source SSD into a migration cache of the target SSD; and after a read completion feedback instruction sent by the source SSD is received, sending a write instruction to the target SSD, so as to instruct the target SSD to write the data block in the cache of the target SSD to a flash memory of the target SSD.

In this way, a cache of an SSD in a storage system is used as a data cache in a data migration process. Therefore, when data is migrated, the migrated data is not transmitted by using the host, so that the migrated data does not occupy CPU bandwidth of the host, impact on performance of the storage system is greatly reduced, and a data migration speed is ensured.

Optionally, migration cache information configured for each SSD is set in a register of a controller of the SSD. In this way, when starting, the host may read the migration cache information of each SSD from the register of the controller of the SSD, allocate the access information to the migration cache of each SSD according to the read migration cache information, and record the access information, so as to implement configuration of the migration cache of each SSD.

According to the foregoing solution, the SSD may use its own cache as a migration cache. Therefore, in the data migration process, the migrated data does not need to be transmitted by using a memory of the host.

There are two manners of generating the read instruction. Manner 1: The to-be-migrated data is divided into multiple data blocks according to a length of the migration cache of the target SSD in the access information of the target SSD and a data volume of the to-be-migrated data in the migration data information, and the read instruction is generated according to migration data information of the data blocks obtained through division and the access information corresponding to the target SSD.

Based on Manner 1, after a data block migrated according to the read instruction is migrated to the target SSD, the target SSD sends a write feedback completion instruction to the host. After receiving the write completion feedback instruction, the host determines whether the data blocks previously obtained through division are all migrated, and if the data blocks are not all migrated, determines one data block from data blocks that are not migrated, and generates a new read instruction for the determined data block, so as to migrate the determined data block, until the data blocks previously obtained through division are all migrated to the target SSD.

By using Manner 1, the to-be-migrated data in the source SSD is divided into data blocks. In this way, during read instruction generation, the data block obtained through division is directly obtained, to generate a read instruction, and the obtained data block is read for migration.

Manner 2: Migration data information of a data block that is currently migrated to the target SSD is obtained according to a length of the migration cache of the target SSD in the access information of the target SSD and a data volume of the to-be-migrated data in the migration data information, and the read instruction is generated according to the obtained migration data information of the data block and the access information corresponding to the target SSD.

Based on Manner 2, after a data block migrated according to the read instruction is migrated to the target SSD, the target SSD sends a write feedback completion instruction to the host. After receiving the write completion feedback instruction sent by the target SSD, the host determines whether there is to-be-migrated data that is not migrated, and if there is to-be-migrated data that is not migrated, obtains migration data information of one data block according to migration data information of the to-be-migrated data that is not migrated, and generates a new read instruction according to the obtained migration data information of the data block, so as to migrate the obtained data block, until all to-be-migrated data is migrated to the target SSD.

By using Manner 2, during read instruction generation, a data block that needs to be migrated according to the read instruction may be obtained by dividing the to-be-migrated data.

In the foregoing various implementations, each read instruction includes a source address and a destination address. The source address is a logical address of a data block read according to each read instruction, and the destination address is a first access address of the migration cache of the target SSD.

In this way, the source SSD may obtain the to-be-migrated data block according to source address information in the read instruction, and temporarily store a to-be-migrated data block in the read data block in a migration cache indicated by the destination address.

In the foregoing various implementations, there may be multiple target SSDs. During read instruction generation, one read instruction is generated for each target SSD, and generated multiple read instructions are sent to the source SSD.

In this way, the to-be-migrated data in the source SSD may be simultaneously migrated to multiple target SSDs, thereby accelerating migration of the to-be-migrated data in the source SSD.

In addition, in the foregoing various implementations, before the obtaining migration data information of to-be-migrated data in a source SSD, the method may further include: detecting a preset data migration condition; and when the preset data migration condition is detected, obtaining the migration data information of the to-be-migrated data in the source SSD.

The preset migration condition may be that it is detected that a pre-invalidation fault occurs in the source SSD, or a data migration command is received.

According to a second aspect, an embodiment of the present disclosure provides another data migration method. The data migration method provided in the second aspect is also applied to a host. A connection relationship between the host and an SSD is the same as that in the data migration method provided in the first aspect. Each SSD is also configured with a migration cache.

A main difference between the data migration method provided in the second aspect and the data migration method provided in the first aspect lies in that in the data migration method provided in the second aspect, the host sends a read instruction to a source SSD, so as to instruct the source SSD to migrate a data block that is corresponding to the read instruction and in the source SSD to a migration cache of the source SSD; and then sends a write instruction to a target SSD, so as to instruct the target SSD to migrate the data block in the migration cache of the source SSD to a flash memory of the target SSD.

In the data migration method provided in the second aspect, a to-be-migrated data block is first migrated to the migration cache of the source SSD. Therefore, when generating the read instruction, the host sets a destination address of the read instruction to access information of the migration cache of the source SSD, and when generating the write instruction, the host sets a source address of the write instruction to the access information of the migration cache of the source SSD. In this way, the source SSD can migrate the data block corresponding to the read instruction to the migration cache of the source SSD according to the read instruction, and the target SSD can write the data block in the migration cache of the source SSD to the flash memory of the target SSD according to the write instruction.

In addition, during data division, data is also divided according to a length of the migration cache of the source SSD.

Others are the same as those in the data migration method provided in the first aspect. Reference may be made to related descriptions, and details are not described herein.

According to a third aspect, an embodiment of the present disclosure provides another data migration method. The data migration method provided in the third aspect is also applied to a host. A connection relationship between the host and an SSD is the same as that in the data migration method provided in the first aspect. Each SSD is also configured with a migration cache.

A main difference between the data migration method provided in the third aspect and the data migration method provided in the first aspect lies in that after determining a target SSD, the host adds access information of the target SSD to a data migration instruction, and sends the data migration instruction to a source SSD, so as to instruct the source SSD to migrate to-be-migrated data in the source SSD to a migration cache of the target SSD, and then the source SSD sends a write request to the target SSD, so as to instruct the target SSD to write the data in the migration cache of the target SSD to a flash memory of the target SSD. After completing migration of the to-be-migrated data in the source SSD, the source SSD sends a migration completion feedback instruction to the host. In this way, the host neither needs to migrate data nor needs to perform data read and write control in a data migration process, thereby further reducing CPU bandwidth occupied in the data migration process, and further reducing impact on performance of a storage system.

According to a fourth aspect, an embodiment of the present disclosure provides another data migration method. The data migration method provided in the fourth aspect is also applied to a host. A connection relationship between the host and an SSD is the same as that in the data migration method provided in the first aspect. Each SSD is also configured with a migration cache.

A main difference between the data migration method provided in the fourth aspect and the data migration method provided in the third aspect lies in that the host adds access information of a migration cache of a source SSD and target SSD information to a data migration instruction, so as to instruct the source SSD to migrate to-be-migrated data in the source SSD to the migration cache of the source SSD, and then the source SSD sends a write request to a target SSD, so as to instruct the target SSD to write the data in the migration cache of the source SSD to a flash memory of the target SSD.

According to a fifth aspect, an embodiment of the present disclosure provides another data migration method. The data migration method provided in the fifth aspect is applied to an SSD. A connection relationship between the SSD and a host is the same as that in the data migration method provided in the first aspect. The SSD is also configured with a migration cache.

The data migration method provided in the fifth aspect is corresponding to the data migration method provided in the third aspect. That is, after a data migration instruction that is sent by the host and that carries access information of a target SSD is received, to-be-migrated data in a source SSD is migrated. A manner of migrating data by the source SSD is the same as that in the data migration method provided in the first aspect. A difference only lies in that in an implementation of the fifth aspect, both generation and execution of a read instruction are completed by the source SSD. In addition, after reading a data block corresponding to the read instruction into a migration cache of the target SSD according to the read instruction, the source SSD adds the access information of the target SSD to a write request, and sends the write request to the target SSD, so that the target SSD writes the data block in the migration cache of the target SSD to a flash memory of the target SSD according to the write request.

According to a sixth aspect, an embodiment of the present disclosure provides another data migration method. The data migration method provided in the sixth aspect is applied to an SSD. A connection relationship between the SSD and a host is the same as that in the data migration method provided in the first aspect. The SSD is also configured with a migration cache.

The data migration method provided in the sixth aspect is corresponding to the data migration method provided in the fourth aspect. That is, after a data migration instruction that is sent by the host and that carries access information of a source SSD and target SSD information is received, to-be-migrated data in the source SSD is migrated. A manner of migrating data by the source SSD is the same as that in the data migration method provided in the second aspect. A difference only lies in that in an implementation of the sixth aspect, both generation and execution of a read instruction are completed by the source SSD. In addition, after reading a data block corresponding to the read instruction into a migration cache of the source SSD according to the read instruction, the source SSD adds the access information of the source SSD to a write request, and sends the write request to the target SSD, so that the target SSD writes the data block in the migration cache of the source SSD to a flash memory of the target SSD according to the write request.

According to a seventh aspect, an embodiment of the present disclosure provides another data migration method. The data migration method provided in the seventh aspect is applied to an SSD. A connection relationship between the SSD and a host is the same as that in the data migration method provided in the first aspect. However, in an implementation of the seventh aspect, the SSD is configured with no migration cache. In a data migration process, data migration is performed mainly by using a register of a controller of the SSD.

The data migration method provided in the seventh aspect is similar to the data migration method provided in the third aspect. A difference only lies in that when the host sends a migration instruction to a source SSD, the migration instruction carries access information of a register of a controller of a target SSD. When the source SSD generates a read instruction according to the migration instruction, data is divided according to a length of the register of the controller of the target SSD. A destination address of the generated read instruction is the access information of the register of the controller of the target SSD. A write request sent to the target SSD also carries the access information of the register of the controller of the target SSD. In this way, the source SSD may execute the read instruction to read a data block that is corresponding to the read instruction and in the source SSD into the register of the controller of the target SSD. The target SSD may read the data block in the register of the controller of the target SSD into a flash memory of the target SSD according to the write request.

With various implementations of the foregoing embodiments of the present disclosure, a cache or a register of an SSD in the storage system may be used as a data cache in the data migration process. Therefore, during data migration, migrated data is not transmitted by using the host, so that the migrated data does not occupy CPU bandwidth of the host, thereby greatly reducing impact on performance of the storage system, and ensuring a data migration speed.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
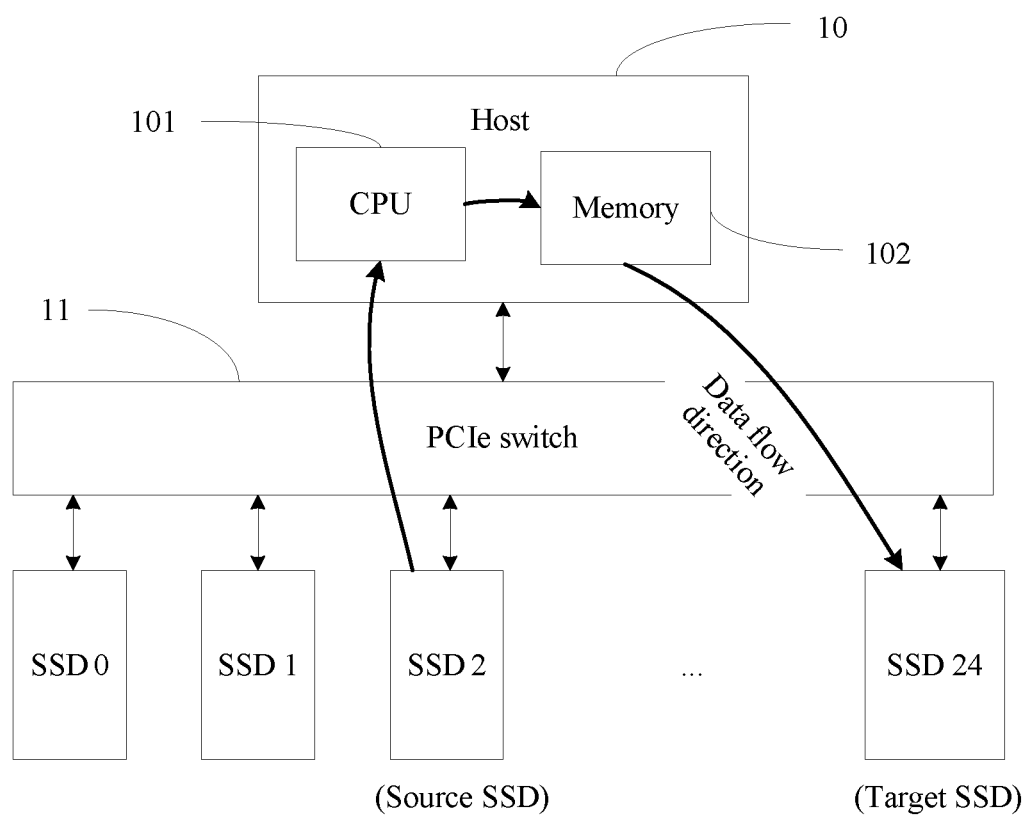
FIG. 1 is an architecture diagram of a storage system.

As shown in FIG. 1, FIG. 1 is an architecture diagram of a storage system. The storage system includes a host 10, and multiple SSDs (that is, an SSD 0 to an SSD 24) that are coupled to the host 10 by using a Peripheral Component Interconnect Express (PCIe) switch 11. The host 10 includes a CPU 101 and a memory 102.

Figure 2:
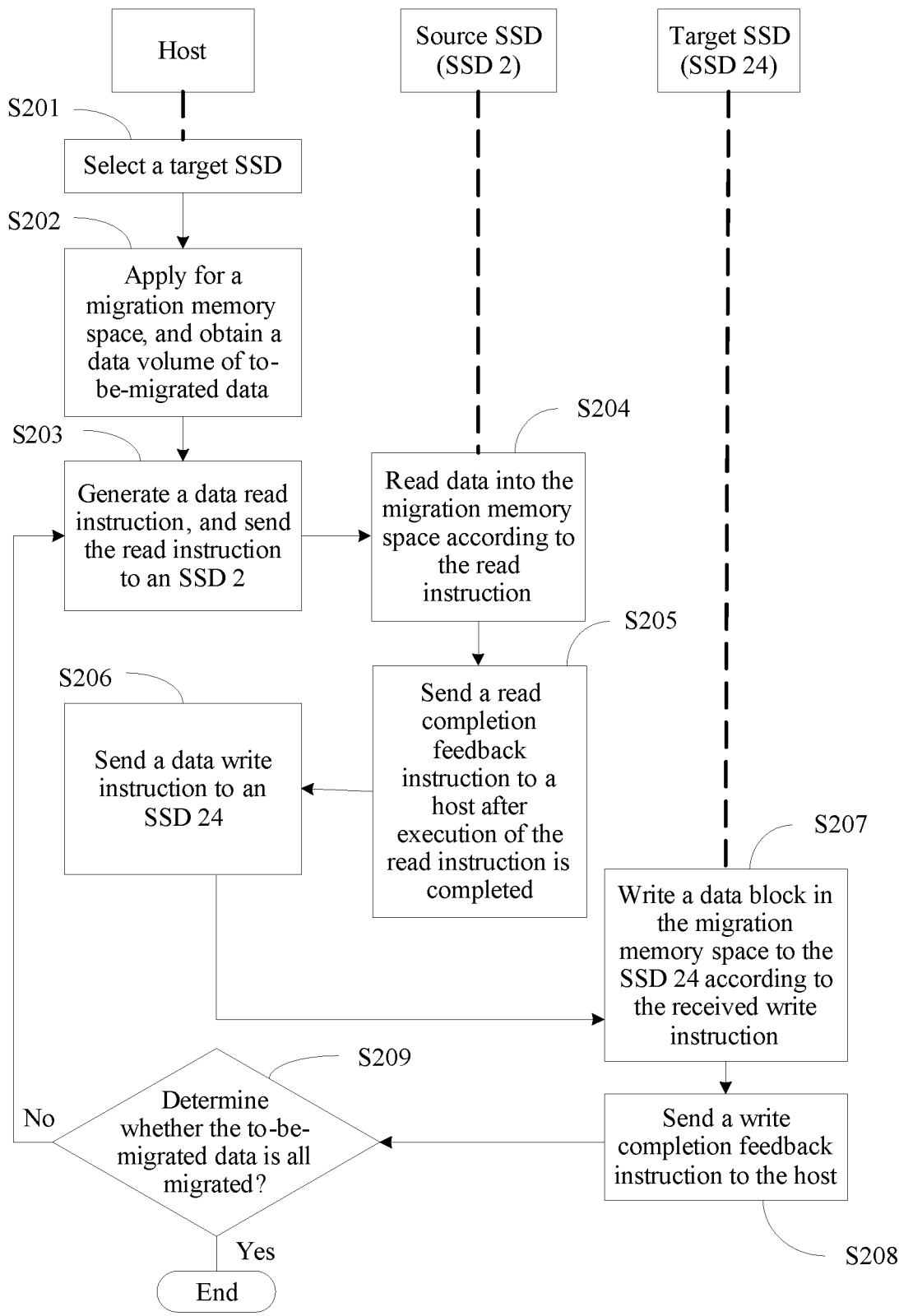
FIG. 2 is a flowchart of a method for migrating data between SSDs in some approaches.

In actual application, data migration usually needs to be performed between two SSDs. For example, when the host 10 detects a to-be-invalidated SSD, data in the to-be-invalidated SSD needs to be migrated to another SSD, so as to avoid a data loss caused after the to-be-invalidated SSD is invalidated. Herein, an SSD from which data is migrated is used as a source SSD, and a disk to which the data is migrated is used as a target SSD. As shown in FIG. 1, when data in the SSD 2 needs to be migrated to the SSD 24, the SSD 2 is a source SSD, and the SSD 24 is a target SSD. With reference to FIG. 2, the following describes a method for migrating data in a source SSD to a target SSD in some approaches.

As shown in FIG. 2, in step S201, when the CPU 101 detects that the data in the SSD 2 needs to be migrated out, for example, detects that the data in the SSD 2 is to be ineffective, the CPU 10 selects a target SSD, that is, the SSD 24, from another SSD, so as to migrate the data in the SSD 2 to the SSD 24.

Step S202: The CPU 101 applies to the memory 102 for a migration memory space dedicated for data migration, and obtains a data volume of to-be-migrated data.

Step S203: The CPU 101 generates a read instruction according to a length of the migration memory space and the obtained data volume of the to-be-migrated data, and sends the read instruction to the SSD 2.

Step S204: The SSD 2 reads, according to the read instruction, a data block that is corresponding to the read instruction and in the SSD 2 into the migration memory space.

Step S205: After completing execution of the read instruction, the SSD 2 sends a read completion feedback instruction to the host 10.

Step S206: The CPU 101 sends a write instruction to the SSD 24 according to the read completion feedback instruction.

Step S207: The SSD 24 writes the data block in the migration memory space to the SSD 24 according to a received data write instruction.

Step S208: The SSD 24 sends a write completion feedback instruction to the host 10.

Step S209: After receiving the write completion feedback instruction sent by the SSD 24, the CPU 101 determines whether migration of all to-be-migrated data in the SSD 2 is completed, and if the migration is not completed, returns to step S203, and generates a new read instruction, to continue to migrate the to-be-migrated data in the SSD 2, or if the migration is completed, ends a data migration procedure.

It may be learned from the foregoing data migration method that, in some approaches, when data in a source SSD is migrated to a target SSD, a data migration process needs to be controlled by the host 10, and migration needs to be performed by using the memory 102. In this way, even if bandwidth that is of the CPU 101 of the host 10 and that is occupied during data migration is limited, performance of the storage system is still affected. In addition, a CPU bandwidth limit or even a bandwidth limit of the data migration causes a quite slow data migration speed, and increases a risk of losing migrated data, thereby affecting reliability of the storage system.

According to a data migration method provided in embodiments of the present disclosure, when data is migrated from a source SSD to a target SSD, the data does not pass through a memory of a host in a migration process, but is directly transmitted by using an interface of a PCIe switch without occupying CPU bandwidth of the host. Therefore, performance of a storage system is not affected. In addition, a data migration speed is not limited by the CPU bandwidth of the host, thereby increasing a data migration speed. The following describes the data migration method provided in the present disclosure by using multiple embodiments.

First Embodiment

Figure 3:
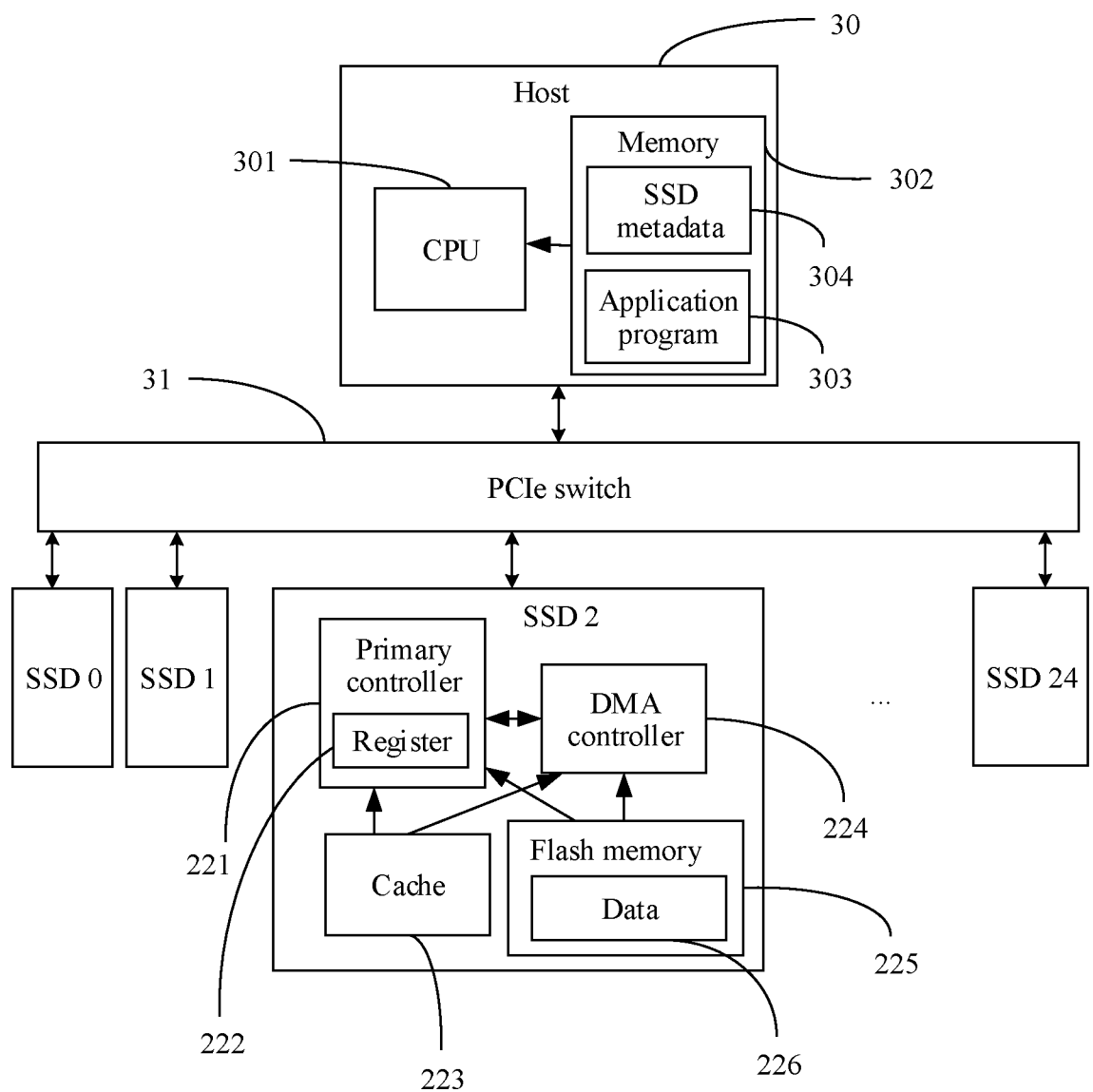
FIG. 3 is an architecture diagram of a storage system according to a first embodiment of the present disclosure.

As shown in FIG. 3, FIG. 3 is an architecture diagram of a storage system according to the first embodiment of the present disclosure. The architecture of the storage system in the first embodiment is basically the same as an architecture of the storage system in FIG. 1, and includes a host 30, a PCIe switch 31, and an SSD 0 to an SSD 24. The SSD 0 to the SSD 24 are coupled to each other by using the PCIe switch 31.

The host 30 includes a CPU 301 and a memory 302. The CPU 301 is configured to run an application program 303 in the memory 302, to implement some functions provided by the host 30, for example, control data access and migration in the SSD 0 to the SSD 24. The memory 302 further stores metadata 304 of the SSD 0 to the SSD 24. The metadata 304 records information about data stored in each SSD, for example, a data volume of the stored data and logical address information of the stored data.

The SSD 0 to the SSD 24 have a basically same structure. The following describes a structure of each SSD by using the SSD 2 as an example. As shown in FIG. 3, the SSD 2 includes a primary controller 221, a direct memory access (DMA) controller 224, a cache 223, and a flash memory 225. The primary controller 221 is configured to receive a data access command sent by the host 30, so as to control data access in the flash memory 225 according to the access command from the host 30. The DMA controller 224 may directly access a memory of another device, for example, the memory of the host 30, or a cache of another SSD. The cache 223 stores a program instruction for when the primary controller 221 or the DMA controller 224 runs, or temporarily stores data read from the flash memory 225 or data to be written to the flash memory 225. The flash memory is a main storage element of the SSD, and is configured to store data 226 written to the SSD.

Figure 4:
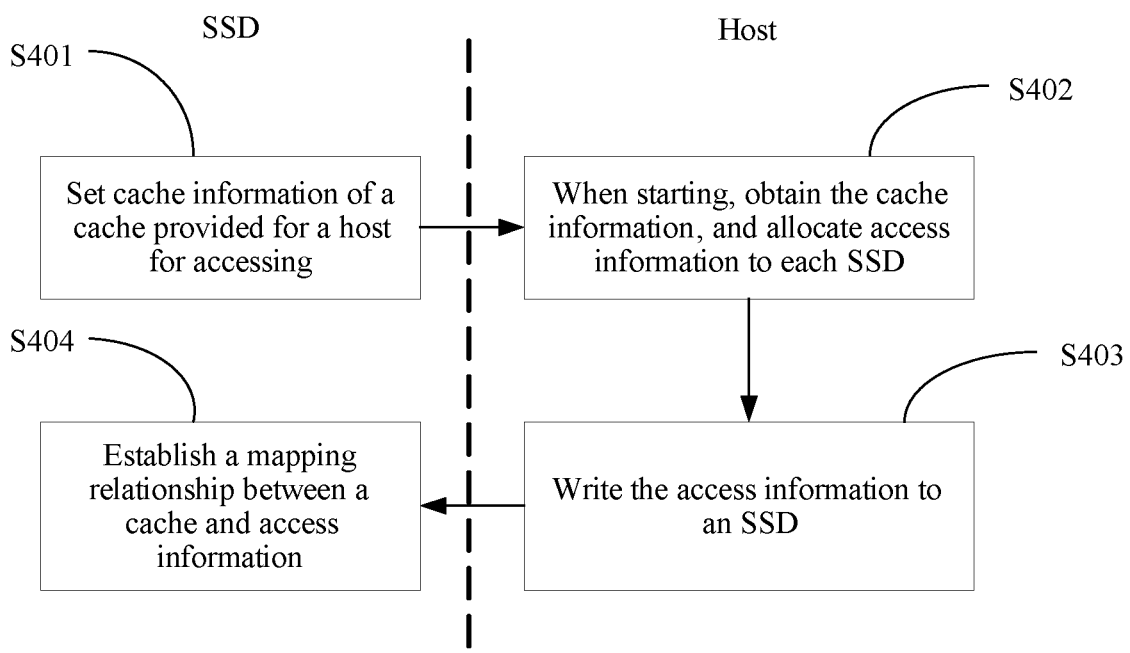
FIG. 4 is a flowchart of a method for configuring a migration cache for an SSD according to the first embodiment of the present disclosure.

In this embodiment, each SSD may provide a cache for the host 30 and another SSD for access. For a method for providing the cache by each SSD for the host 30 and another SSD for access, refer to a flowchart shown in FIG. 4. The cache provided by each SSD for the host and another SSD for access is referred to as a migration cache in the following.

Step S401: Each SSD sets cache information of a migration cache in a register 222 of a controller 221 of the SSD. In this embodiment, the cache information includes a size of the migration cache. The size of the migration cache of each SSD may be determined according to a specific application environment, for example, may be determined according to factors such as performance of the storage system, a size of a cache of the SSD, and interface bandwidth of the SSD. Migration caches of all SSDs may have a same size, or may have different sizes. When some SSDs do not need to provide a cache for the host and another SSD for use, the SSDs may set a size of the cache to 0 in the register 222.

Step S402: During a BIOS boot phase of the host 30, the host 30 reads migration cache information of each SSD from the register 222 of the primary controller 221 of the SSD, separately allocates access information to the migration cache of each SSD according to the read migration cache information, and records, in metadata 304 of each SSD, the access information allocated to the SSD, where the access information includes a first access address and a length of the migration cache of the SSD. The first access address is address information in the memory of the host, and the address information is corresponding to start address information of the migration cache of the SSD. When the host needs to access a cache of the SSD, the host needs to first find the first access address in the memory 302, and accesses the migration cache of the SSD according to the first access address.

Step S403: The host 30 separately writes, to the register of each SSD, the access information allocated to the migration cache of the SSD. In specific implementation, only the first access address may be written.

Step S404: Each SSD selects, from the cache 223 as the migration cache, a cache space that has a size the same as the set cache size, and establishes a mapping relationship between the access information and the migration cache.

In this way, the host 30 may access the migration cache of each SSD by using the access information or the migration cache of each SSD may be accessed by another SSD other than the SSD by using the access information. For example, if a migration cache is configured for the SSD 0 by using the foregoing method, the host or the SSD 1 to the SSD 24 may access the migration cache by using the access information.

Figure 5:
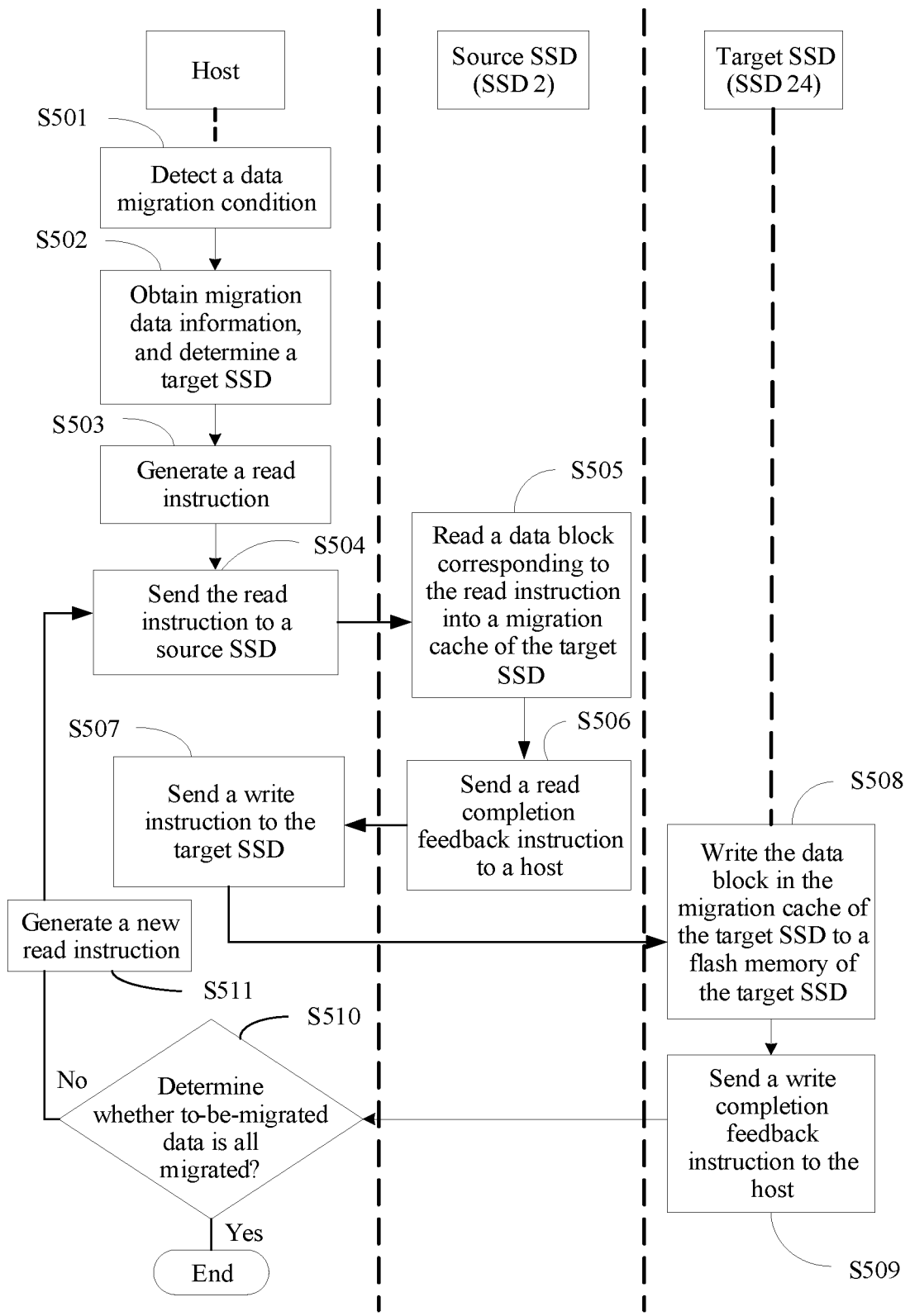
FIG. 5 is a flowchart of a data migration method according to the first embodiment of the present disclosure.

After the migration cache of each SSD is determined, data migration between SSDs may be performed by using the migration cache. A specific migration method is shown in FIG. 5.

Step S501: The host detects a preset data migration condition.

The preset data migration condition may be that an SSD in the storage system is determined to be invalidated or a data migration request is received. The migration request is from an application or another device.

Step S502: When the preset data migration condition is detected, the host obtains migration data information of to-be-migrated data in a source SSD, and determines a target SSD.

The host 30 obtains the migration data information of the to-be-migrated data in the source SSD from metadata that is of the source SSD and that is stored in the memory 302. The migration data information includes a data volume and a logical address of the to-be-migrated data.

The target SSD may be determined by a user, or may be a backup disk that is set for the source SSD in advance. There may be one or more target SSDs, and a specific quantity may be determined according to a data migration speed requirement.

When determining the target SSD, the user may select the target SSD according to a data volume stored in each SSD and a busy/idle status of the SSD, that is, may select, as the target SSD, an SSD that stores a relatively small data volume and that is relatively idle currently.

Step S503: Generate a read instruction according to access information corresponding to the target SSD and the migration data information.

In this implementation, two manners of generating the read instruction are provided. Manner 1: The to-be-migrated data is first divided into multiple data blocks according to a length that is of a migration cache provided by the target SSD and that is in the access information of the target SSD and the data volume of the to-be-migrated data in the migration data information. A length of each data block is less than or equal to the length of the migration cache. Usually, the length of each data block is equal to the length of the migration cache, and a logical address of each data block may be determined according to the logical address of the to-be-migrated data and the length of the data block obtained through division. In addition, for each target SSD, one data block is obtained, and one read instruction is generated.

Manner 2: During read instruction generation, not all to-be-migrated data is divided, and instead, only one data block is obtained through division for one target SSD. A length of the data block obtained through division is less than or equal to a length of the migration cache. Usually, the length of the data block obtained through division is equal to the length of the migration cache. Then a logical address of the data block obtained through division is determined, and the read instruction is generated for the data block obtained through division.

The read instruction includes a source address and a destination address. The source address is a logical address of a data block read according to the read instruction, and the destination address is a first access address of the migration cache of the target SSD. When multiple target SSDs are determined, one data block is obtained for each target SSD in ascending order of logical addresses of the to-be-migrated data, so as to generate multiple read instructions.

Step S504: The host 30 sends the read instruction to the source SSD.

When generating multiple read instructions according to multiple target SSDs, the host 30 sequentially sends the multiple read instructions to the source SSD according to a generation sequence.

Step S505: After receiving the read instruction, the source SSD reads a data block that is corresponding to the read instruction and in a flash memory 225 of the source SSD into a migration cache of the target SSD.

In this implementation, after receiving the read instruction, a primary controller of the source SSD instructs the DMA controller 224 of the source SSD to find, according to the source address in the read instruction, a data block corresponding to the source address from the flash memory of the source SSD, and then write, according to the destination address, the data block to a cache of the target SSD indicated by the destination address. When writing the data block to the cache of the target SSD, the DMA controller 224 first transmits, by using the PCIe switch, the data block and the destination address to the target SSD indicated by the destination address. Then the target SSD finds, according to the first access address in the destination address, a physical address of a migration cache corresponding to the first access address, and then stores the data block in the migration cache.

Step S506: After reading all data blocks into the migration cache of the target SSD, the source SSD sends a read completion feedback instruction to the host 30.

Step S507: After receiving the read completion feedback instruction sent by the source SSD, the host 30 sends a write instruction to the target SSD, where the write instruction includes a source address and a destination address, the source address of the write instruction is access information of the migration cache of the target SSD, and the destination address of the write instruction is a logical address corresponding to a storage space that is in a flash memory of the target SSD and that stores the data block.

Step S508: The target SSD reads the data block from the migration cache of target SSD according to the source address of the write instruction, and writes the data block in the migration cache to the flash memory of the target SSD according to the destination address.

Step S509: After the target SSD completes writing of the data block, the target SSD sends a write completion feedback instruction to the host 30.

Step S510: After receiving the write completion feedback instruction, the host 30 determines whether the to-be-migrated data in the source SSD is all migrated.

Step S511: If the to-be-migrated data in the source SSD is not all migrated, generate a new read instruction, and return to step S504; or if the to-be-migrated data in the source SSD is all migrated, end a data migration procedure. A destination address of the generated new read instruction is access information of the migration cache of the target SSD that sends the feedback instruction. After receiving multiple feedback instructions, the host 30 generates one new read instruction for each feedback instruction.

If the manner of generating the read instruction in step S503 is Manner 1, in step S511, one data block is determined from a data block that is not migrated, and a new read instruction is generated for the determined data block.

If the manner of generating the read instruction in step S503 is Manner 2, in step S511, to-be-migrated data that is not migrated is divided to obtain one data block, and a new read instruction is generated according to the data block newly obtained through division.

According to the method provided in the foregoing embodiment, data in the source SSD can be directly transmitted to the target SSD without using the memory of the host 30. Therefore, CPU bandwidth of the host 30 is not occupied, and a speed of data migration between SSDs is increased.

Figure 6:
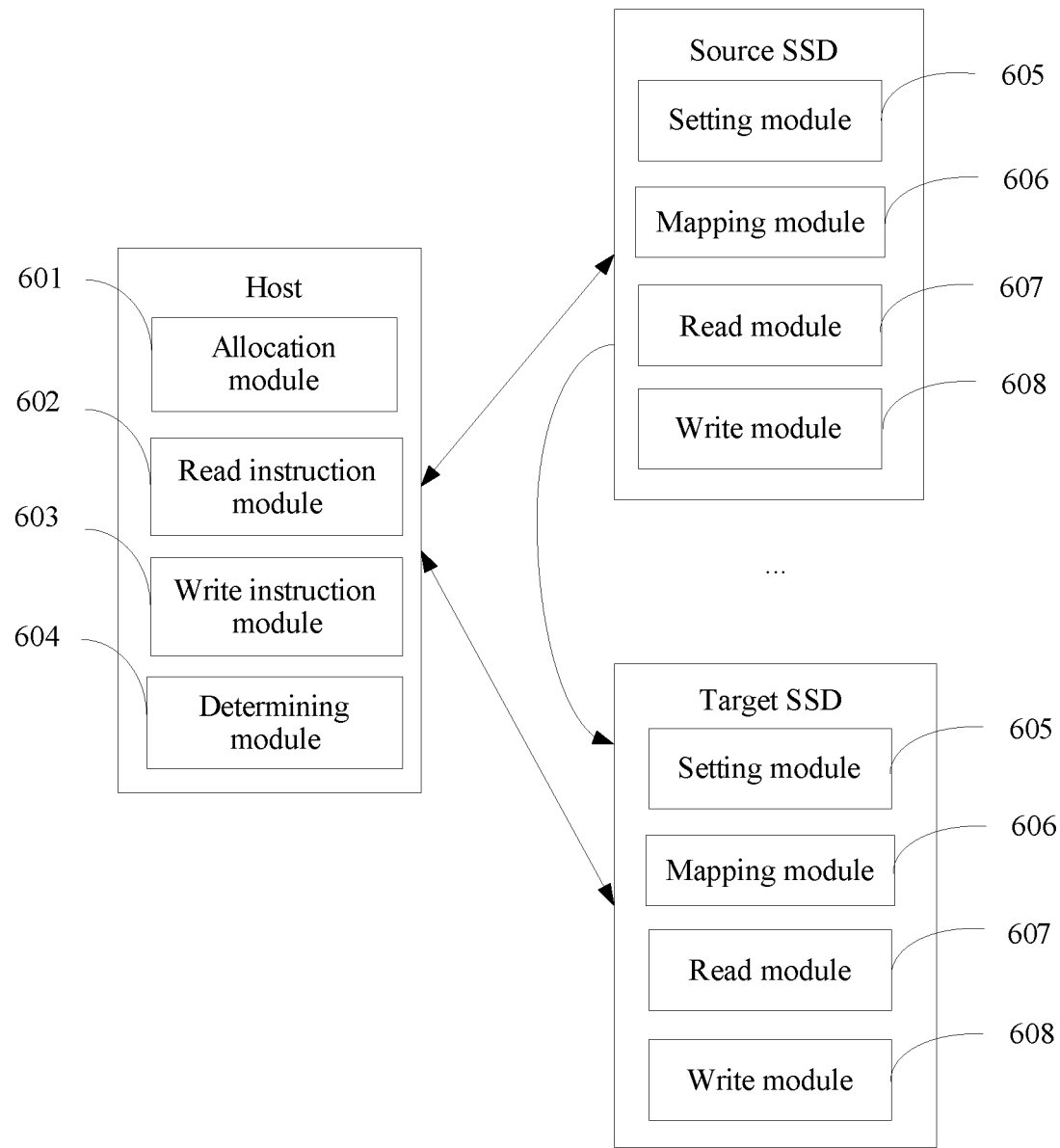
FIG. 6 is a function block diagram of a host and an SSD that are in a storage system and corresponding to the data migration method in the first embodiment.

As shown in FIG. 6, FIG. 6 is a function block diagram of the host 30 and the SSD in the storage system shown in FIG. 3 in this embodiment (only a block diagram of the source SSD and the target SSD for data migration is shown in the figure). The host 30 includes an allocation module 601, a read instruction module 602, a write instruction module 603, and a determining module 604. The SSD includes a setting module 605, a mapping module 606, a read module 607, and a write module 608. In the figure, all SSDs include same function modules. However, in actual application, when the SSD is used as a source SSD from which data is migrated, a function executed by the write module 608 is not executed, and when the SSD is used as a target SSD to which data is migrated, a function executed by the read module 607 is not executed.

According to a data migration process, the following describes a function executed by each module of the host and the SSD.

The setting module 605 of each SSD cooperates with the allocation module 601 of the host 30, to implement a function of providing a migration cache in the SSD for the host and another SSD for access. This is corresponding to the method for providing the cache by the SSD for the host for access in FIG. 4. Specifically, the setting module 605 of the SSD is configured to set cache information of a migration cache in a register 222 of a controller 221 of the SSD. For a specific setting manner, refer to the description of step S401.

The allocation module 601 of the host 30 is configured to: during a BIOS boot phase of the host 30, read migration cache information of each SSD from a register 222 of a primary controller 221 of the SSD, separately allocate access information to a migration cache of each SSD according to the read migration cache information, record, in metadata 204 of each SSD, the access information allocated to the SSD, and separately write, to the register of each SSD, the access information allocated to the migration cache of the SSD. For a specific allocation manner, refer to the description of step S402.

The mapping module 606 is configured to: select, from a cache 223 as the migration cache, a cache space that has a size the same as a set cache size, and establish a mapping relationship between the access information and the migration cache. This is corresponding to step S404.

The read instruction module 602 of the host 30 is configured to: detect a preset data migration condition, and when the preset data migration condition is detected, obtain migration data information of to-be-migrated data in a source SSD and determine a target SSD, generate a read instruction according to access information corresponding to the target SSD and the migration data information, and send the generated read instruction to the source SSD. A function executed by the read instruction module 602 is corresponding to steps S501 to S504. Two manners of generating the read instruction are the same as those in step S503, and are not described herein.

After receiving the read instruction, the source SSD reads a data block that is corresponding to the read instruction and in a flash memory of the source SSD into a migration cache of the target SSD. After all data blocks are read into the migration cache of the target SSD, the source SSD sends a read completion feedback instruction to the host 30. For a process of reading data from the flash memory of the source SSD, refer to descriptions of steps S505 and S506.

After receiving the read completion feedback instruction sent by the source SSD, the write instruction module 603 of the host sends a write instruction to the target SSD. A function executed by the write instruction module 603 is corresponding to step S507.

The write module 608 of the target SSD writes a cache address in the target SSD to a flash memory of the target SSD according to the write instruction, and after writing of the cache address is completed, sends a write completion feedback instruction to the host 30.

The determining module 604 of the host 30 determines whether the to-be-migrated data in the source SSD is all migrated, and if the to-be-migrated data in the source SSD is not all migrated, generates a new read instruction, and sends the new read instruction to the source SSD; or if the to-be-migrated data in the source SSD is all migrated, ends a data migration process. For a manner of generating a new read instruction, refer to a related description in step S511.

Second Embodiment

A difference between the second embodiment and the first embodiment only lies in that in the second embodiment, to-be-migrated data in a source SSD is first read into a migration cache of the source SSD, and then the data in the migration cache of the source SSD is written to a target SSD. The following describes a data migration method in the second embodiment with reference to a flowchart.

In the second embodiment, an architecture of a storage system is the same as that in FIG. 3. An SSD in the storage system also provides a cache for a host and another SSD for access. Therefore, in the following description, the second embodiment is described still by using the architecture in FIG. 3. In addition, a method for providing the cache by the SSD for the host and the another SSD for access is the same as the manner in the first embodiment. For details, refer to the description in FIG. 4, and details are not described herein.

Figure 7:
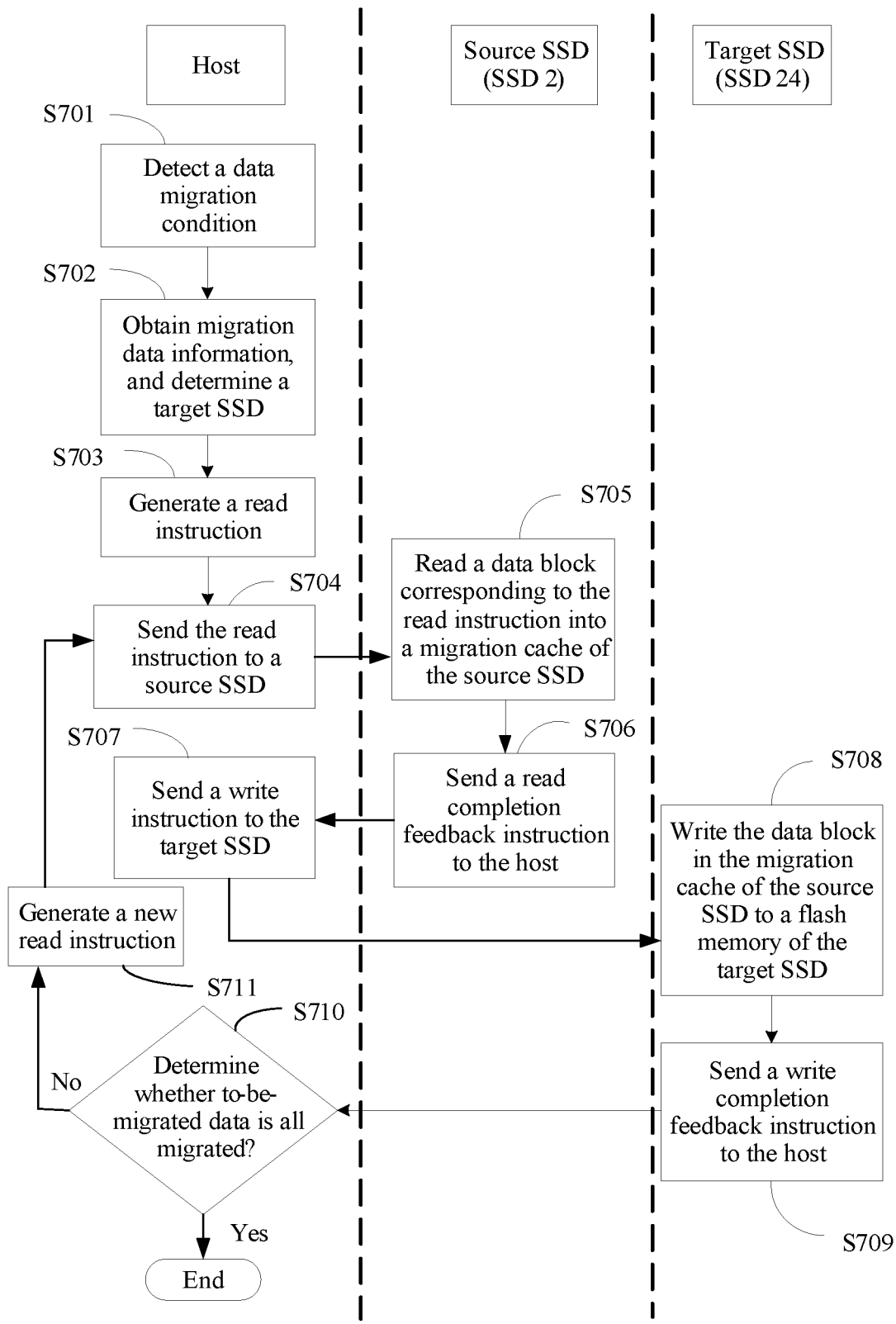
FIG. 7 is a flowchart of a data migration method according to a second embodiment of the present disclosure.

With reference to FIG. 7, the following describes a method for migrating the to-be-migrated data in the source SSD to the target SSD in the second embodiment.

Step S701: A detection host detects a preset data migration condition. This step is the same as step S501 in the first embodiment, and is not described herein.

Step S702: When the preset data migration condition is detected, the host determines the target SSD. A manner of determining the target SSD is also the same as that in step S502 in the first embodiment, and is not described herein.

Because in the second embodiment, the to-be-migrated data in the source SSD needs to be read into a migration cache in a cache of the source SSD, in step S703, a read instruction is generated according to access information of the source SSD and the migration data information.

There are also two manners of generating the read instruction according to the access information of the source SSD and the migration data information.

Manner 1: The to-be-migrated data is divided into multiple data blocks according to a length of the migration cache of the source SSD in the access information of the source SSD and a data volume of the to-be-migrated data in the migration data information, and the read instruction is generated according to migration data information of the data blocks obtained through division and the access information corresponding to the source SSD.

Manner 2: Migration data information of a data block that is currently migrated to the target SSD is obtained according to a length of the migration cache of the source SSD in the access information of the source SSD and a data volume of the to-be-migrated data in the migration data information, and the read instruction is generated according to the obtained migration data information of the data block and the access information corresponding to the source SSD.

A source address of the read instruction is a logical address of a data block read by the source SSD, and the destination address is a first access address of the migration cache of the source SSD.

After the read instruction is sent to the source SSD by using step 704, in step S705, the source SSD reads, according to the read instruction, a data block that is corresponding to the read instruction and in a flash memory of the source SSD into the migration cache of the source SSD.

After all data blocks are read into the migration cache of the source SSD, in step S706, the source SSD also generates a read completion feedback instruction, and sends the read completion feedback instruction to the host.

In step S707, after receiving the read completion feedback instruction, the host sends a write instruction to the target SSD. A source address of the write instruction is a logical address of a data block read according to the read instruction. The destination address is a logical address of a storage space that is in a flash memory of the target SSD and that is used to store the data block.

Step S708: The target SSD writes the data block in the migration cache of the source SSD to the target SSD according to the write instruction.

Specifically, after receiving the write instruction, the target SSD instructs the DMA controller of the target SSD to write, to a cache of the target SSD in a DMA manner by using the PCIe switch, the data block stored in the migration cache of the source SSD.

When the DMA controller obtains the data block in the migration cache of the source SSD in the DMA manner, the DMA controller transmits the first access address of the source SSD to the source SSD. The source SSD obtains, according to the first access address, the data block stored in the migration cache of the source SSD, and then writes the data block to the flash memory of the target SSD by using the PCIe switch.

Step S709: After the target SSD completes writing of the data block, the target SSD sends a write completion feedback instruction to the host.

Step S710: After receiving the write completion feedback instruction, the host determines whether the to-be-migrated data in the source SSD is all migrated.

Step S711: If the to-be-migrated data in the source SSD is not all migrated, generate a new read instruction, and return to step S704; or if the to-be-migrated data in the source SSD is all migrated, end a data migration procedure.

If the manner of generating the read instruction in step S703 is Manner 1, in step S711, one data block is determined from a data block that is not migrated, and a new read instruction is generated for the determined data block.

If the manner of generating the read instruction in step S703 is Manner 2, in step 711, to-be-migrated data that is not migrated is divided to obtain one data block, and a new read instruction is generated according to the data block newly obtained through division.

In the second embodiment, a function block diagram of the host and the SSD is the same as the function modules included in the host and the SSD in the first embodiment, but some function modules execute different functions.

An allocation module 601 of the host and a setting module 605 and a mapping module 606 of the SSD execute same functions as those in the first embodiment. This is not described herein.

In this embodiment, data in the flash memory of the source SSD is first migrated to the migration cache of the source SSD. Therefore, when the read instruction module 602 generates a read instruction, a destination address of the generated read instruction is access information of the migration cache of the source SSD. In this way, a read module 607 of the source SSD reads, according to the read instruction, a data block corresponding to the read instruction into the migration cache of the source SSD. A source address of a write instruction sent by a write instruction module 603 of the host is the access information of the migration cache of the source SSD. A write module of the target SSD migrates the data block in the migration cache of the source SSD to the flash memory of the target SSD according to the write instruction.

Other parts are the same as those in the first embodiment, and are not described herein.

Third Embodiment

A difference between the third embodiment and the first embodiment lies in that in the third embodiment, when detecting that data in a source SSD needs to be migrated, an SSD of a host only needs to send a migration command to the source SSD. The source SSD may migrate to-be-migrated data in a flash memory of the source SSD to a target SSD according to the migration command. After data in a cache of the source SSD is all migrated, the source SSD only needs to send a migration completion feedback instruction to the host. In this way, in an entire data migration process, the host only needs to exchange a command with the source SSD twice, but does not need to participate in the data migration process, thereby further reducing host bandwidth occupied during data migration between SSDs. The following describes a data migration method in the third embodiment with reference to a flowchart.

In the third embodiment, an architecture of a storage system is the same as that in FIG. 3. An SSD in the storage system also provides a migration cache for the host and another SSD for access. Therefore, in the following description, the third embodiment is described still based on the architecture in FIG. 3. In addition, a method for providing the migration cache by the SSD for the host and the another SSD for access is the same as the method in the first embodiment. For details, refer to the description in FIG. 4, and details are not described herein.

Figure 8A:
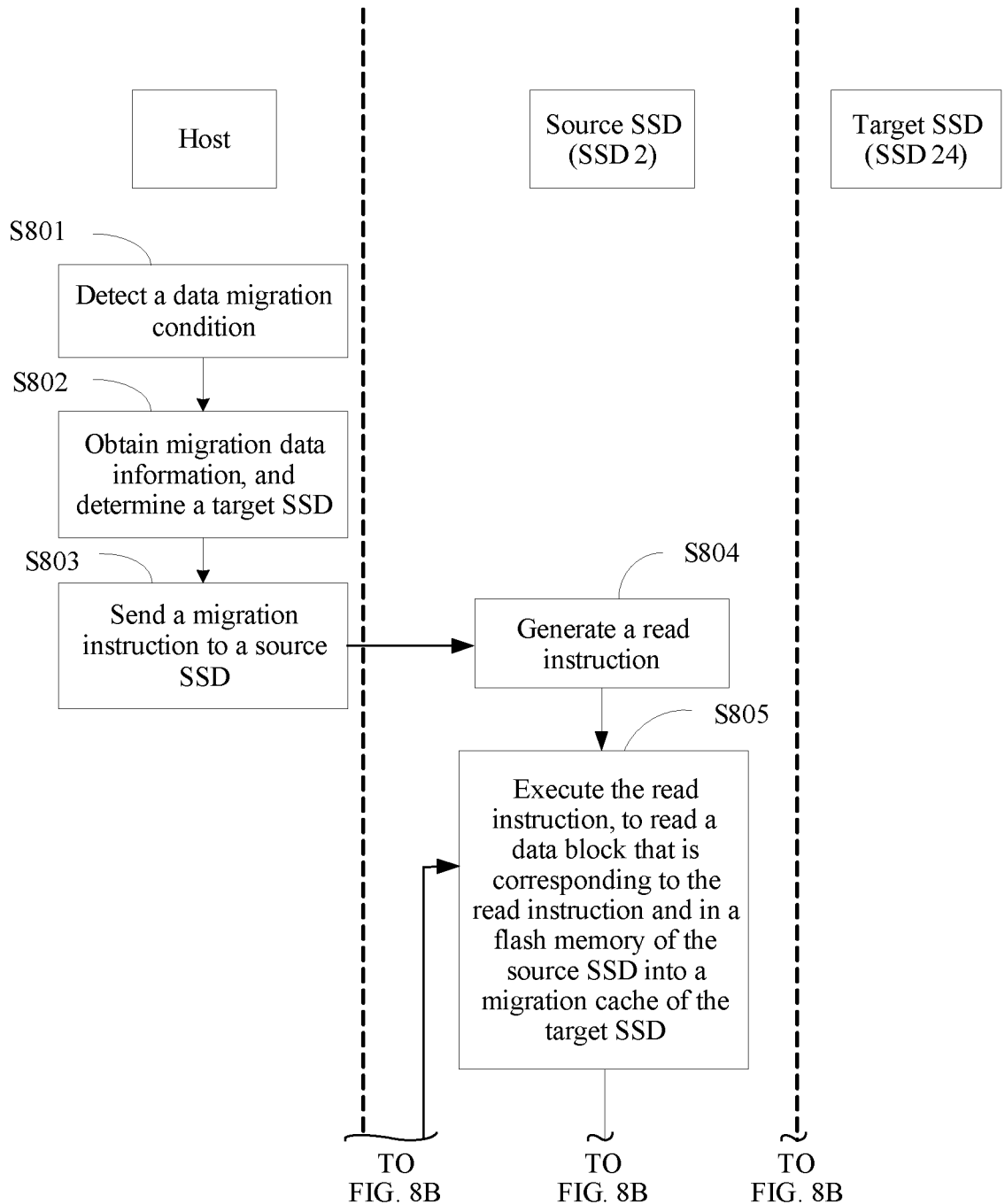
FIG. 8A and FIG. 8B are flowcharts of a data migration method according to a third embodiment of the present disclosure.
Figure 8B:
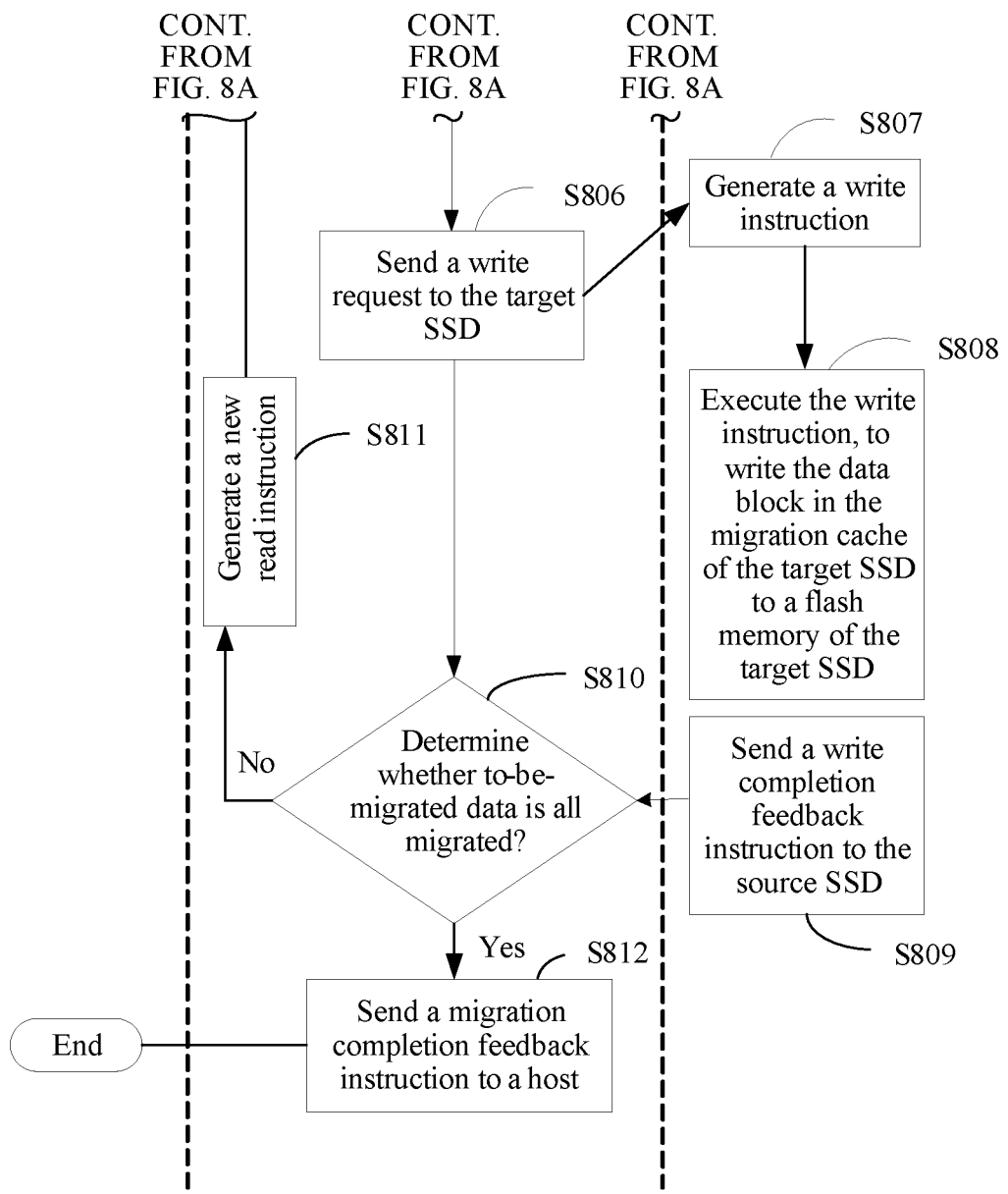

With reference to FIG. 8A and FIG. 8B, the following describes a method for migrating the to-be-migrated data in the source SSD to the target SSD in the third embodiment.

Step S801: A detection host detects a preset data migration condition. This step is the same as step S501 in the first embodiment, and is not described herein.

Step S802: When the preset data migration condition is detected, the host determines the target SSD. A manner of determining the target SSD is also the same as that in step S502 in the first embodiment, and is not described herein.

Step S803: The host sends a data migration instruction to the source SSD, where the data migration instruction carries access information corresponding to the target SSD.

Step S804: The source SSD generates a read instruction according to the to-be-migrated data in the source SSD and the access information that is corresponding to the target SSD and that is carried in the received migration instruction.

In this embodiment, there are two manners of generating the read instruction by the source SSD. Manner 1: The to-be-migrated data is divided into multiple data blocks according to a length that is of a migration cache provided by the target SSD and that is in the access information of the target SSD and a data volume of the to-be-migrated data in the source SSD. A length of each data block is equal to the length of the migration cache. In addition, a storage address of each data block may be determined according to a storage address of the to-be-migrated data and the length of the data block obtained through division. In addition, for each target SSD, one data block is obtained, and one read instruction is generated. It should be noted that the storage address herein is a logical address of data in an SSD, and data stored in an SSD can be found according to a mapping relationship between a logical address of data in an SSD and a physical address.

Manner 2: During read instruction generation, not all to-be-migrated data is divided, and instead, only one data block is obtained through division for one target SSD. A storage address of the data block obtained through division is determined, and then a read instruction is generated for the data block obtained through division.

The read instruction includes a source address and a destination address. The source address is a storage address of a data block read according to the read instruction, and the destination address is a first access address of the migration cache of the target SSD. When multiple target SSDs are determined, one data block is obtained for each target SSD in ascending order of storage addresses of the to-be-migrated data, so as to generate multiple read instructions.

Step S805: The source SSD executes the read instruction, to read a data block that is corresponding to the read instruction and in a flash memory of the source SSD into a migration cache of the target SSD.

In this embodiment, the data block that is corresponding to the read instruction and in the flash memory of the source SSD is read into the migration cache of the target SSD also by using a DMA controller of the source SSD. A process of reading the data block by the DMA is the same as that in the first embodiment. For details, refer to a related description in step S505 in the first embodiment.

Step S806: After completing execution of the read instruction, the source SSD sends a write request to the target SSD, where the write request includes access information of the migration cache of the target SSD.

Step S807: The target SSD generates a write instruction according to the write request. The write instruction includes a source address and a destination address. The source address of the write instruction is the access information of the migration cache of the target SSD, and the destination address of the write instruction is a storage address that is in a flash memory of the target SSD and that is used to store the data block.

Step S808: Execute the write instruction, to write the data block in the migration cache of the target SSD to the flash memory of the target SSD.

Step S809: After completing writing, the target SSD sends a write completion feedback instruction to the source SSD.

Step S810: After receiving the write completion feedback instruction, the source SSD determines whether the to-be-migrated data is all migrated, and if the to-be-migrated data is not all migrated, performs step S811; or if the to-be-migrated data is all migrated, performs step S812.

Step S811: Generate a new read instruction, and then return to step S805. If the manner of generating the read instruction in step S804 is Manner 1, in step S811, the source SSD determines one data block from data blocks that are not migrated, and generates a new read instruction for the determined data block.

If the manner of generating the read instruction in step S804 is Manner 2, in step S811, the source SSD obtains one data block by dividing to-be-migrated data that is not migrated, and generates a new read instruction according to the data block newly obtained through division.

Step S812: The source SSD sends a migration completion feedback instruction to the host, and after receiving the migration completion feedback instruction, the host may end the data migration method.

Figure 9:
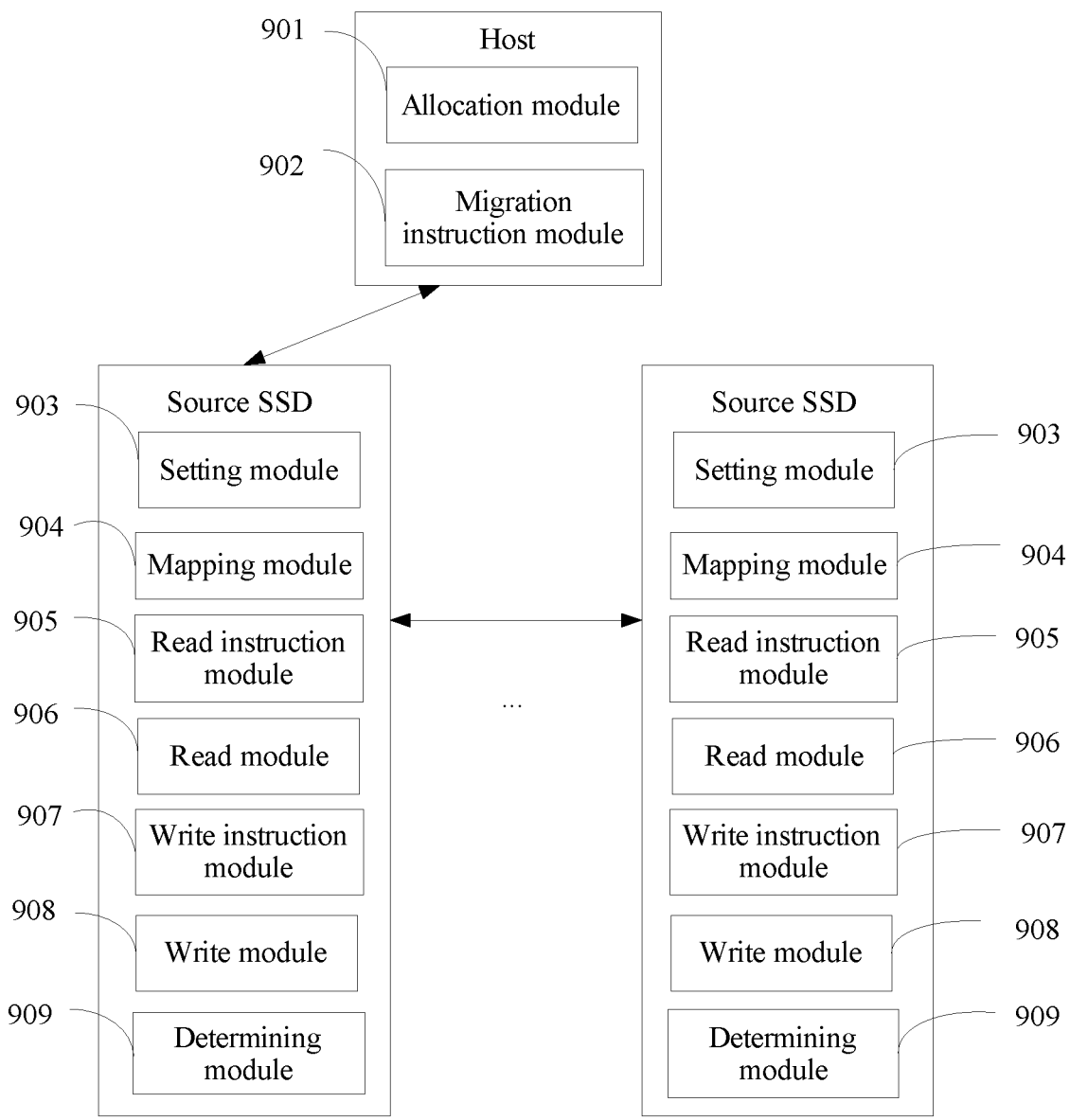
FIG. 9 is a function block diagram of a host and an SSD that are in a storage system and corresponding to the data migration method in the third embodiment.

As shown in FIG. 9, FIG. 9 is a block diagram of the host and the SSD in the third embodiment. The host includes an allocation module 901 and a migration instruction module 902. The SSD includes a setting module 903, a mapping module 904, a read instruction module 905, a read module 906, a write instruction module 907, a write module 908, and a determining module 909. In this embodiment, functions executed by the allocation module 901 of the host and the setting module 903 and the mapping module 904 of the SSD are the same as those of the allocation module 601, the setting module 605, and the mapping module 606 in the first embodiment, and are not described herein.

The migration instruction module 902 of the host is configured to: when a preset data migration condition is detected, determine a target SSD, and send a data migration instruction to a source SSD, where the data migration instruction carries access information corresponding to the target SSD.

A read instruction module 905 of the source SSD is configured to generate a read instruction according to to-be-migrated data in the source SSD and the access information that is corresponding to the target SSD and that is carried in the received migration instruction. For the two manners of generating the read instruction, refer to the description of step S804.

A read module 906 of the source SSD is configured to execute the read instruction, to read a data block that is corresponding to the read instruction and in a flash memory of the source SSD into a migration cache of the target SSD. This is corresponding to step 805.

After execution of the read instruction is completed, a write instruction module 907 of the source SSD sends a write request to the target SSD, where the write request includes access information of the migration cache of the target SSD.

A write module 908 of the target SSD generates a write instruction according to the write request. The write instruction includes a source address and a destination address. The source address of the write instruction is the access information of the migration cache of the target SSD, and the destination address of the write instruction is a storage address that is in a flash memory of the target SSD and that is used to store the data block. The data block in the migration cache of the target SSD is written to the flash memory of the target SSD according to the write instruction, and after writing is completed, a write completion feedback instruction is sent to the source SSD.

After receiving the write completion feedback instruction, a determining module 909 of the source SSD determines whether the to-be-migrated data is all migrated, and if the to-be-migrated data is not all migrated, generates a new read instruction, or if the to-be-migrated data is all migrated, sends a migration completion feedback instruction to the host, so that the host ends data migration. A manner of generating the new read instruction is the same as that in step S811, and is not described herein.

Fourth Embodiment

The fourth embodiment and the third embodiment are similar, and differ only in that when to-be-migrated data in a source SSD is migrated to a target SSD, the to-be-migrated data in the source SSD is first migrated to a migration cache of the source SSD, and then the data in the migration cache of the source SSD is migrated to a flash memory of the target SSD.

In the fourth embodiment, an architecture of a storage system is the same as that in FIG. 3. An SSD in the storage system also provides a cache for a host for access. Therefore, in the following description, the fourth embodiment is described still based on the architecture in FIG. 3. In addition, a method for providing the cache by the SSD for the host for use is the same as the method in the first embodiment. For details, refer to the description in FIG. 4, and details are not described herein.

Figure 10A:
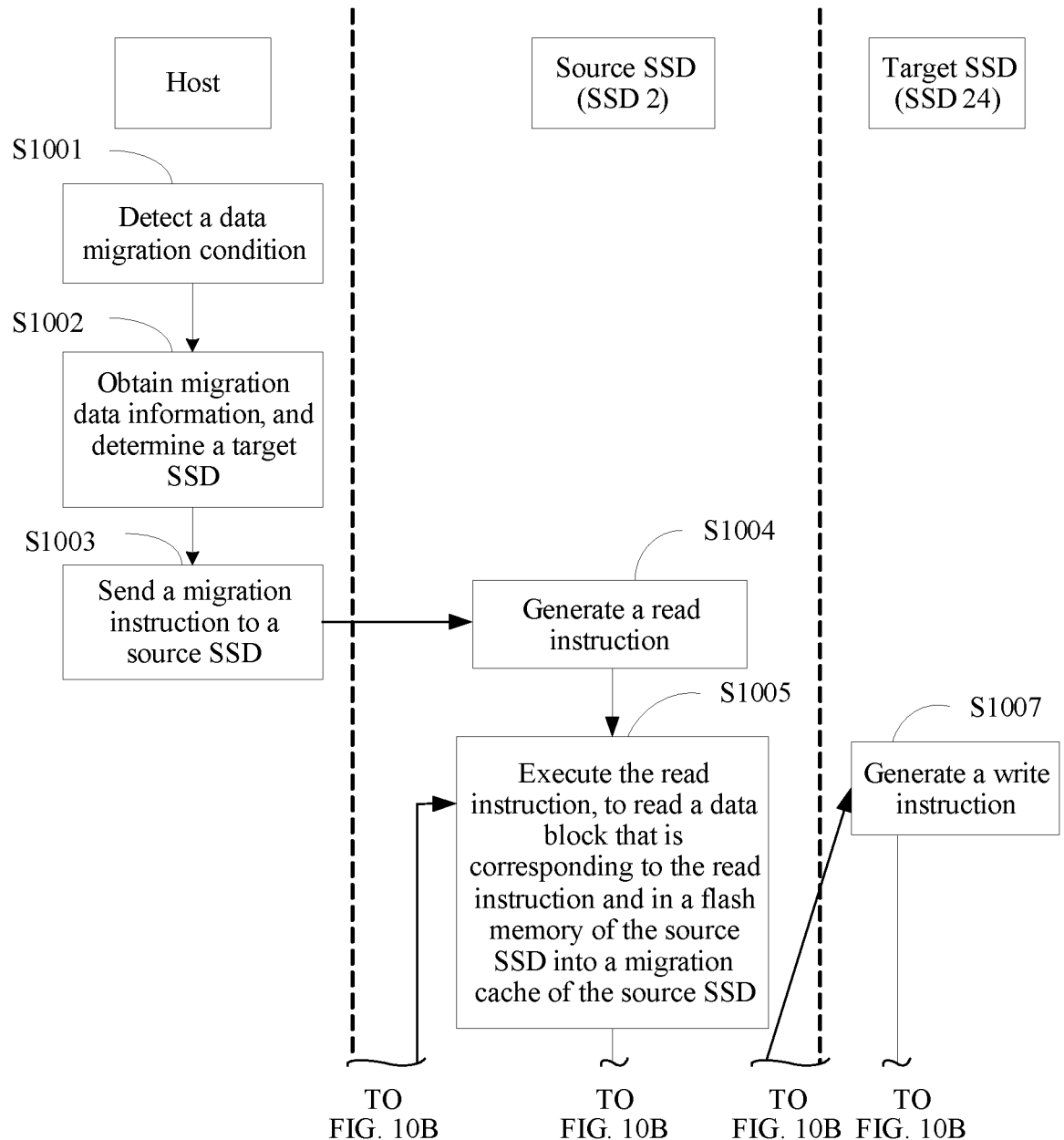
FIG. 10A and FIG. 10B are flowcharts of a data migration method according to a fourth embodiment of the present disclosure.
Figure 10B:
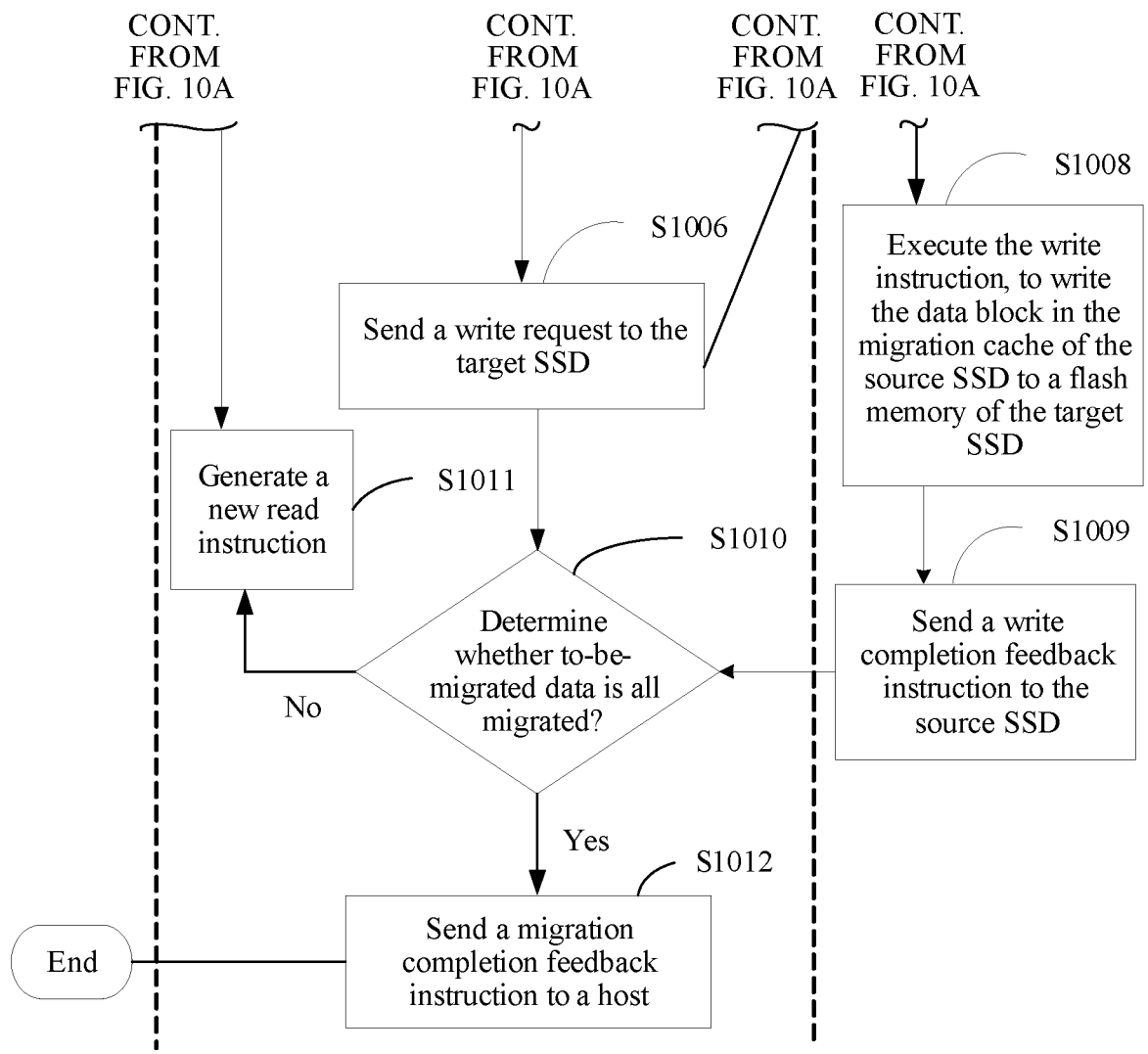

With reference to FIG. 10A and FIG. 10B, the following describes a method for migrating the to-be-migrated data in the source SSD to the target SSD in the fourth embodiment.

Step S1001: A detection host detects a preset data migration condition. This step is the same as step S501 in the first embodiment, and is not described herein.

Step S1002: When the preset data migration condition is detected, the host determines the target SSD. A manner of determining the target SSD is also the same as that in step S502 in the first embodiment, and is not described herein.

Step S1003: The host sends a data migration instruction to the source SSD, where the data migration instruction carries access information corresponding to the source SSD and target SSD information.

Step S1004: The source SSD generates a read instruction according to the to-be-migrated data in the source SSD and the access information that is corresponding to the source SSD and that is carried in the received migration instruction.

A manner of generating the read instruction by the source SSD is similar to the two manners of generating the read instruction by the source SSD in the third embodiment. A difference only lies in that a destination address of the generated read instruction is the access information corresponding to the source SSD.

Step S1005: The source SSD executes the read instruction, to read a data block that is corresponding to the read instruction and in a flash memory of the source SSD into a migration cache of the source SSD.

Step S1006: After completing execution of the read instruction, the source SSD sends a write request to a target SSD corresponding to the target SSD information, where the write request carries access information of the migration cache of the source SSD.

Step S1007: The target SSD generates a write instruction according to the write request, where a source address of the write instruction is the access information corresponding to the source SSD, and a destination address of the write instruction is an address that is in a flash memory of the target SSD and that is used to store the data block in the migration cache of the source SSD.

Step S1008: The target SSD executes the write instruction, to migrate the data block in the migration cache of the source SSD to the flash memory of the target SSD.

Step S1009: After completing execution of the write instruction, the target SSD sends a write completion feedback instruction to the source SSD.

Step S1010: After receiving the write completion feedback instruction, the source SSD determines whether the to-be-migrated data is all migrated, and if the to-be-migrated data is not all migrated, performs step S1011; or if the to-be-migrated data is all migrated, performs step S1012.

Step S1011: Generate a new read instruction, and then return to step S1005. If the manner of generating the read instruction in step S1004 is Manner 1, in step S1011, the source SSD determines one data block from data blocks that are not migrated, and generates a new read instruction for the determined data block.

If the manner of generating the read instruction in step S1004 is Manner 2, in step S1011, the source SSD obtains one data block by dividing to-be-migrated data that is not migrated, and generates a new read instruction according to the data block newly obtained through division.

Step S1012: The source SSD sends a migration completion feedback instruction to the host, and after receiving the migration completion feedback instruction, the host may end the data migration method.

In the fourth embodiment, a function block diagram of the host and the SSD is the same as the function modules included in the host and the SSD in the first embodiment, but some function modules execute different functions.

Functions executed by an allocation module 901 of the host and a setting module 903 and a mapping module 904 of the SSD are the same as those of the allocation module 601 of the host, and the setting module 605 and the mapping module 606 of the SSD in the first embodiment, and are not described herein.

In this embodiment, data in the flash memory of the source SSD is first migrated to the migration cache of the source SSD. Therefore, when a read instruction module 905 generates a read instruction, a destination address of the generated read instruction is the access information of the migration cache of the source SSD. In this way, a read module 906 of the source SSD reads, according to the read instruction, a data block corresponding to the read instruction into the migration cache of the source SSD. A write request sent by the write instruction module 907 carries the access information of the migration cache of the source SSD. A write module of the target SSD generates a write instruction according to the write request, and executes the write instruction to migrate the data block in the migration cache of the source SSD to the flash memory of the target SSD. A source address of the write instruction is the access information corresponding to the source SSD, and a destination address of the write instruction is an address that is in the flash memory of the target SSD and that is used to store the data block in the migration cache of the source SSD.

Other parts have same functions as those of modules included in the host and the SSD in the third embodiment. This is not described herein.

Fifth Embodiment

In the fifth embodiment, an SSD in a storage system does not need to provide a cache for a host and another SSD for access, and instead, data migration between SSDs is performed by using a register of a controller in the SSD.

An architecture of the storage system is the same as the architecture in FIG. 3. A method for migrating data between SSDs by using the register of the controller of the SSD is similar to the data migration method provided in the third embodiment. A difference only lies in that access information corresponding to a target SSD is information about a register of a controller of the target SSD. The information about the register includes a first access address of the register and a length of the register. In some approaches, access information of the register is recorded on the host. Therefore, the host may directly obtain the information about the register of the controller of the target SSD. The following describes the data migration method in this embodiment with reference to the data migration method in the third embodiment shown in FIG. 8A and FIG. 8B. In this embodiment, access information corresponding to an SSD is information about a register of a controller of the SSD. Therefore, information that is corresponding to the target SSD and that is carried in a migration instruction sent by the host is the information about the register of the controller of the target SSD (corresponding to step S804 in FIG. 8A). In this way, in a step of generating a read instruction (corresponding to step S804 in FIG. 8A), a data block is obtained through division and read according to the information about the register of the controller of the target SSD, such as a length of the register. A destination address of the generated read instruction is access information of the register of the controller of the target SSD. Correspondingly, in this embodiment, in a step of executing the read instruction (corresponding to step S805 in FIG. 8A), the source SSD reads a data block that is corresponding to the read instruction and in a flash memory of the source SSD into the register of the controller of the target SSD. In addition, in a step of sending a write request (corresponding to step S806 in FIG. 8B), the write request also carries the access information of the register of the controller of the target SSD. A source address of a write instruction generated by the target SSD is the access information of the register. Therefore, the target SSD may write the data block in the register of the controller of the target SSD to a flash memory of the target SSD according to the write instruction. Other steps are basically the same as those in the third embodiment. For details, refer to a related description in FIG. 8A and FIG. 8B.

Figure 11:
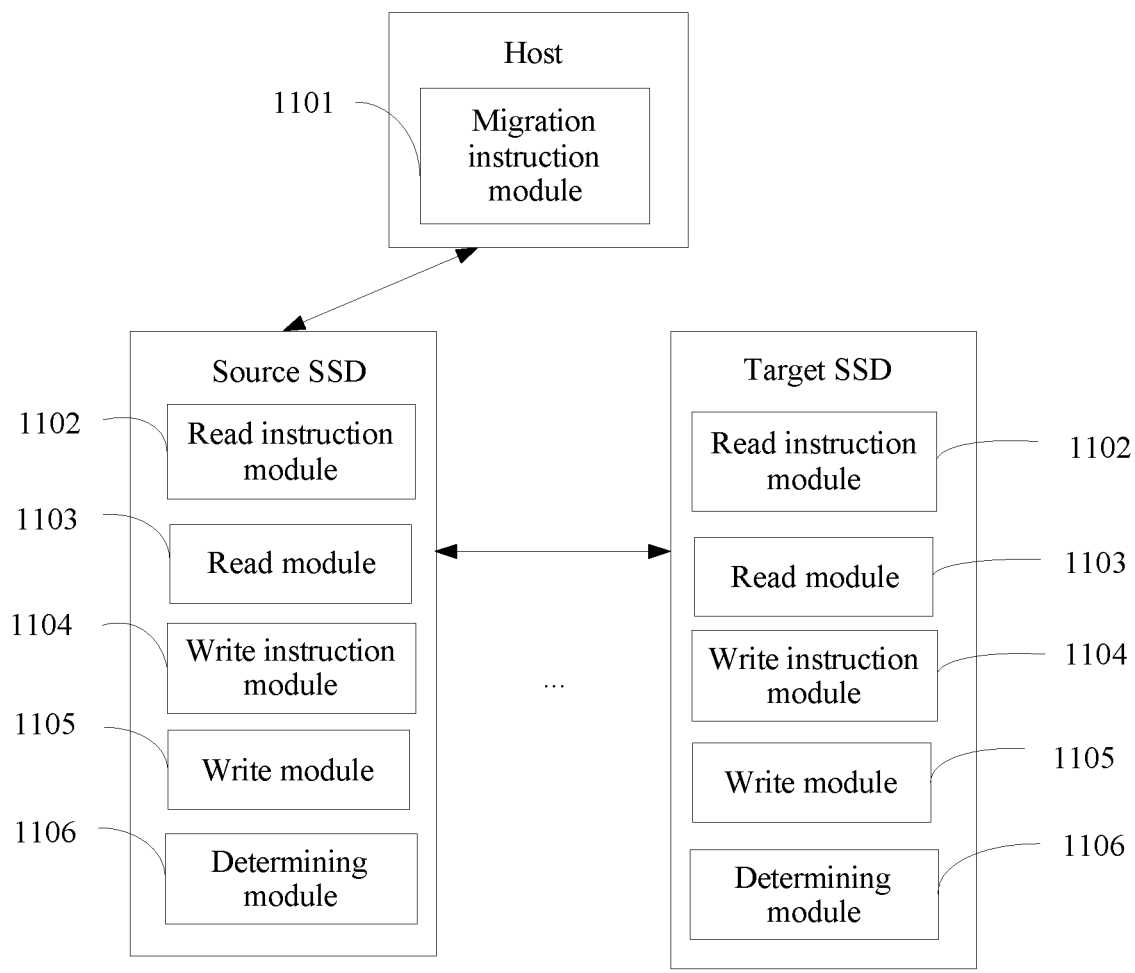
FIG. 11 is a function block diagram of a host and an SSD in a storage system according to a fifth embodiment of the present disclosure.

FIG. 11 is a block diagram of a host and an SSD in the fifth embodiment. In the fifth embodiment, the SSD does not need to provide a migration cache for the host and another SSD for access. Therefore, there is no setting module or mapping module, and correspondingly, the host includes no allocation module. Specifically, as shown in FIG. 11, the host includes a migration instruction module 1101, and the SSD (includes a source SSD and a target SSD) includes a read instruction module 1102, a read module 1103, a write instruction module 1104, a write module 1105, and a determining module 1106.

Because the access information corresponding to the SSD is the information about the register of the controller of the SSD in this embodiment, information that is corresponding to the target SSD and that is carried in a migration instruction sent by the migration instruction module 1101 of the host is information about a register of a controller of the target SSD. When the read instruction module 1102 generates a read instruction, a data block is obtained through division and read according to the information about the register of the controller of the target SSD, such as a length of the register. A destination address of the generated read instruction is access information of the register of the controller of the target SSD. Correspondingly, the read module 1103 of the source SSD reads a data block that is corresponding to the read instruction and in a flash memory of the source SSD into the register of the controller of the target SSD. In addition, when the write instruction module 1104 of the source SSD sends a write request, the write request also carries the access information of the register of the controller of the target SSD. A source address of a write instruction generated by the write instruction module 1104 of the target SSD is the access information of the register. Therefore, the write module 1105 of the target SSD may write the data block in the register of the controller of the target SSD to a flash memory of the target SSD according to the write instruction. Functions executed by other modules are basically the same as functions executed by corresponding modules in the third embodiment. For details, refer to descriptions of related modules in FIG. 9. The details are not described herein.

The foregoing describes in detail a data migration method, a host, and a solid-sate storage device provided in the embodiments of the present disclosure. In this specification, specific examples are used to describe the principle and the implementations of the present disclosure, and the description of the embodiments is only intended to help understand the method and the core idea of the present disclosure. In addition, a person of ordinary skill in the art can make modifications to specific implementations and application scopes according to the idea of the present disclosure. In conclusion, the content of this specification shall not be construed as a limitation on the present disclosure.

What is claimed is:

1. A data migration method comprising:
   receiving, from a host, a data migration instruction comprising migration data information of to-be-migrated data stored in a source solid-state disk (SSD) cache of a source SSD coupled to the host; and
   reading, in response to the data migration instruction, a to-be-migrated data block within the to-be-migrated data from the source SSD cache into a target SSD cache of a target SSD coupled to the host.

2. The data migration method of claim 1, further comprising:
   generating a read instruction corresponding to the data migration instruction, wherein the read instruction comprises access information of the target SSD cache; and
   executing the read instruction to read the to-be-migrated data block.

3. The data migration method of claim 2, further comprising generating a read completion feedback instruction instructing the target SSD to write data blocks from the target SSD cache to a flash memory of the target SSD.

4. The data migration method of claim 2, further comprising obtaining, according to a length of the target SSD cache and a data volume of the to-be-migrated data, the migration data information of a data block that is currently being migrated to the target SSD.

5. The data migration method of claim 4, further comprising further generating the read instruction according to the migration data information of the data block.

6. The data migration method of claim 2, wherein the read instruction comprises a destination address.

7. The data migration method of claim 6, wherein the destination address is a first access address of the target SSD cache.

8. A system comprising:
   a host configured to send a data migration instruction comprising migration data information of to-be-migrated data; and
   solid-state disks (SSDs) configured to couple to the host and comprising:
     a target SSD comprising a target SSD cache; and
     a source SSD comprising a source SSD cache, wherein the source SSD cache is configured to store to-be-migrated data, and wherein the source SSD is configured to:
       receive the data migration instruction from the host; and
       read, in response to the data migration instruction, a to-be-migrated data block within the to-be-migrated data from the source SSD cache into the target SSD cache.

9. The system of claim 8, wherein the source SSD is further configured to:
   generate a read instruction corresponding to the data migration instruction, wherein the read instruction comprises access information of the target SSD cache; and
   execute the read instruction to read the to-be-migrated data block.

10. The system of claim 9, wherein the host is further configured to allocate the access information to the target SSD cache and the source SSD cache according to cache information of the SSDs.

11. The system of claim 9, further comprising a switch configured to:
    couple to the source SSD and the target SSD; and
    store the access information.

12. The system of claim 9, wherein the source SSD is further configured to:
    generate a read completion feedback instruction; and
    send the read completion feedback instruction to the host.

13. The system of claim 12, wherein the target SSD further comprises a flash memory, and wherein the host is further configured to instruct, in response to the read completion feedback instruction, the target SSD to write data blocks from the target SSD cache to the flash memory.

14. The system of claim 9, wherein the source SSD is further configured to:
    obtain, according to a length of the target SSD cache and a data volume of the to-be-migrated data, the migration data information of a data block that is currently being migrated to the target SSD; and
    further generate the read instruction according to the migration data information of the data block.

15. The system of claim 8, wherein the host is further configured to read, during a basic input/output system (BIOS) boot phase of the host, cache information of the SSDs from registers of controllers of the SSDs.

16. A source solid-state disk (SSD) comprising:
    a source SSD cache configured to store to-be-migrated data; and
    a controller configured to:
      receive, from a host, a data migration instruction comprising migration data information of the to-be-migrated data; and
      read, in response to the data migration instruction, a to-be-migrated data block within the to-be-migrated data from the source SSD cache into a target SSD cache of a target SSD coupled to the host,
    wherein the source SSD is configured to couple to the host.

17. The source SSD of claim 16, wherein the controller is further configured to:
    generate a read instruction corresponding to the data migration instruction, wherein the read instruction comprises access information of the target SSD cache; and
    execute the read instruction to read the to-be-migrated data block.

18. The source SSD of claim 17, wherein the controller is further configured to generate a read completion feedback instruction instructing the target SSD to write data blocks from the target SSD cache to a flash memory of the target SSD.

19. The source SSD of claim 17, wherein the controller is further configured to:
    obtain, according to a length of the target SSD cache and a data volume of the to-be-migrated data, the migration data information of a data block that is currently being migrated to the target SSD; and
    further generate the read instruction according to the migration data information of the data block.

20. The source SSD of claim 17, wherein the read instruction comprises a destination address.

* * * * *